United States Patent [19]

Kinoshita et al.

[11] Patent Number: 4,475,800
[45] Date of Patent: Oct. 9, 1984

[54] FOCUS DETECTING SYSTEM

[75] Inventors: Takao Kinoshita, Tokyo; Kazuya Hosoe, Kunitachi, both of Japan

[73] Assignee: Canon Kabushiki Kaisha, Tokyo, Japan

[21] Appl. No.: 577,329

[22] Filed: Feb. 8, 1984

Related U.S. Application Data

[63] Continuation of Ser. No. 313,584, Oct. 21, 1981, abandoned.

[30] Foreign Application Priority Data

Oct. 23, 1980 [JP] Japan ............................. 55-149063
Jan. 13, 1981 [JP] Japan ............................. 56-3580

[51] Int. Cl.³ .............................................. G03B 3/00
[52] U.S. Cl. .................................... 354/406; 354/286; 354/409
[58] Field of Search ............... 354/402, 406, 407, 423, 354/286, 409

[56] References Cited

U.S. PATENT DOCUMENTS 3,967,056  6/1976  Yata et al. ........................... 178/7.2
4,344,679  8/1982  Yagi et al. .......................... 354/60 E
4,362,372  12/1982  Kiesel .................................. 354/195

Primary Examiner—Russell E. Adams
Attorney, Agent, or Firm—Fitzpatrick, Cella, Harper & Scinto

[57] ABSTRACT

A focus detecting system for detecting a focusing state is adaptable to various optical systems of different specifications. The focus detecting mode of the system changes according to the specifications of the associated optical system and the focus detection signal is normalized to compensate for changes in the brightness, contrast and pattern of the object being focussed. Additionally, the field of view may be varied in accordance with the selected optical system and the focus detection signal is normalized to compensate for changes in the brightness, contrast and pattern of the object being focussed. Additionally, the field of view may be varied in accordance with the selected optical system.

11 Claims, 41 Drawing Figures

FIG.11A
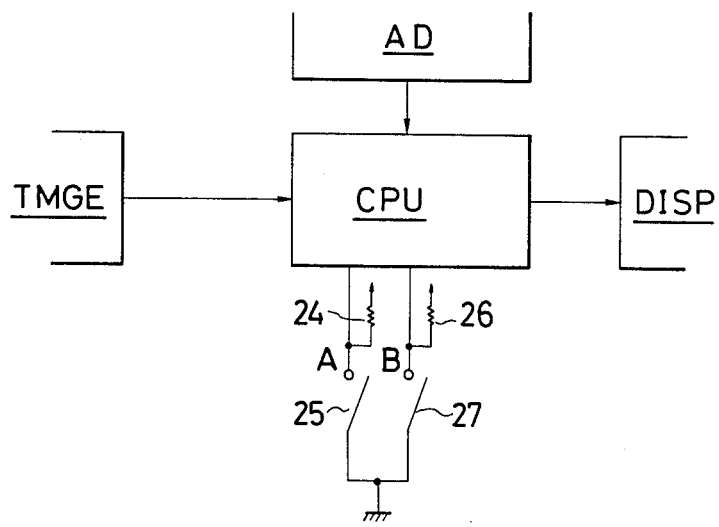
FIG.11B
| A | B | △ |
|---|---|---|
| 0 | 0 | 1 |
| 1 | 0 | 2 |
| 0 | 1 | 4 |
| 1 | 1 | 8 |
FIG.12A
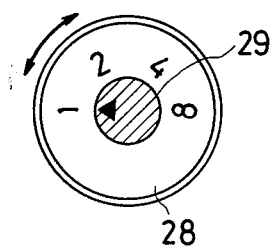
FIG.12B
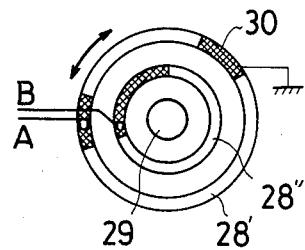

(J-1)

(J-2)

(J-3)

(J-4)

FOCUS DETECTING SYSTEM

This application is a continuation of application Ser. No. 313,584 filed Oct. 21, 1981, now abandoned.

BACKGROUND OF THE INVENTION

1. Field of the Invention

The present invention relates to a focus detecting system and, more particularly, to a focus detecting system which is adaptable to various types of imaging optical systems of different specifications to detect the focusing states thereof.

2. Description of the Prior Art

In single reflex camera systems or the like, the photographic lens assembly is interchangeable between those of different specifications. Therefore, a focus detecting system for such camera systems must be adaptable, in consideration of the fact that the photographic lens assembly is interchangeable between those of different specifications.

For example, it is not very practical to set the in-focus state at a single point to discriminate the in-focus state from the out-of-focus state. Therefore, it is the general practice to set a certain allowable range considering the depth of focus of the optical system involved, so that the in-focus state may be discriminated if the focusing state is within this allowable range. However, when this allowable range is too narrow, it is difficult to attain the in-focus state, resulting in inconvenience. To the contrary, when the allowable range is too wide, it becomes easier to attain the in-focus state while it becomes difficult to attain good focusing precision. In this way, ease in use and focusing precision essentially exclude each other. The balance between these two factors also varies according to the specifications (e.g., the F number, the focal length and so on) of the optical system used. For example, it is more practical to widen the allowable focusing range for an optical system having a greater depth of focus, while it is better to narrow the allowable focusing range for an optical system of a smaller depth of focus.

Apart from the point described above, when the focus detecting system is of the so-called "Through The Lens" type which has a light-receiving section to receive light transmitted by the optical system, the problems to be described below are caused by the various specifications of the optical system, especially by the focal length. If the size of the light-receiving section is fixed as the field of view of focus detection, it is too wide for a lens of short focal length, so that far objects and near objects may be mixed in the field of view. This causes the so-called "far-near competition" and resultant erroneous operation. To the contrary, if the angle of the field of view is too narrow for a lens of long focal length, only a limited part of the subject can enter the field of view for detection. This tends to result in that only a low contrast or solid pattern image enters the field of view. Thus it may become impossible to detect the focusing state. Furthermore, the image enters or leaves the field of view due to camera shake, resulting in unstable detection.

SUMMARY OF THE INVENTION

The present invention has been made in consideration of this, and it is an its object of the invention to provide an improvement in a focus detecting system and, more particularly, a focus detecting system which is adaptable to various optical systems to different specifications, wherein stable focus detecting operations suitable for respective optical systems of different specifications can be automatically performed.

In order to achieve this object, there is provided according to the present invention an improvement in a focus detecting system wherein a focus detecting process is varied according to the specifications of the associated optical system.

It is another object of the present invention to provide a focus detecting system which automatically performs the focus detection with an optimal focusing precision according to optical systems having different specifications.

In order to achieve these objects, there is provided according to the present invention a focus detecting system which is capable of automatically controlling the acceptable in-focus range according to the specifications of the optical system.

It is still another object of the present invention to provide a focus detecting system of the TTL type which utilizes light transmitted by an optical system, and which is capable of constantly performing stable focus detection regardless of changes in the specifications of the optical system.

In order to achieve this object, there is provided a focus detecting system wherein a range of a field of view of detection is automatically controlled according to the specifications of the optical system.

Other objects and features of the present invention will become apparent from the following description when taken in conjunction with the accompanying drawings.

BRIEF DESCRIPTION OF THE DRAWINGS

The preferred embodiments of the present invention will now be described with reference to the accompanying drawings, in which:

FIGS. 1A to 1C are model views for explaining the principle of focus detection operation of an example of a focus detecting system to which the present invention may be applied, wherein FIG. 1A shows the optical arrangement of the focus detecting system, FIG. 1B shows the configuration of light-receiving sections of a photoelectric transducer element shown in FIG. 1A, and FIG. 1C shows changes in sharpness of the image at three points in FIG. 1A;

FIGS. 11A and 11B show an example of the method for changing the acceptable in-focus range to be described with reference to FIGS. 10A and 10B as applied to the circuitry shown in FIG. 2, wherein FIG. 11A shows the configuration of the main circuit part of the circuitry shown in FIG. 2 according to the improvement of the present invention and FIG. 11B shows the relationship between the change-over conditions of the means for changing the acceptable in-focus range shown in FIG. 11A and the resultant acceptable in-focus range;

FIGS. 12A and 12B show examples of the means for changing the acceptable in-focus range of a camera as shown in FIGS. 11A and 11B;

FIGS. 18A and 18B show examples of the method of changing the field of view of detection to be described with reference to FIG. 17 as applied the circuitry shown in FIG. 2, wherein FIG. 18A shows the various fields of view of detection set according to the window functions generated by the window function generator in the circuitry shown in FIG. 2 and FIG. 18B shows a modification of the window function generator according to the present invention for selectively obtaining the various fields of view of detection shown in FIG. 18A;

DETAILED DESCRIPTION OF THE PREFERRED EMBODIMENTS

Figure 1A:
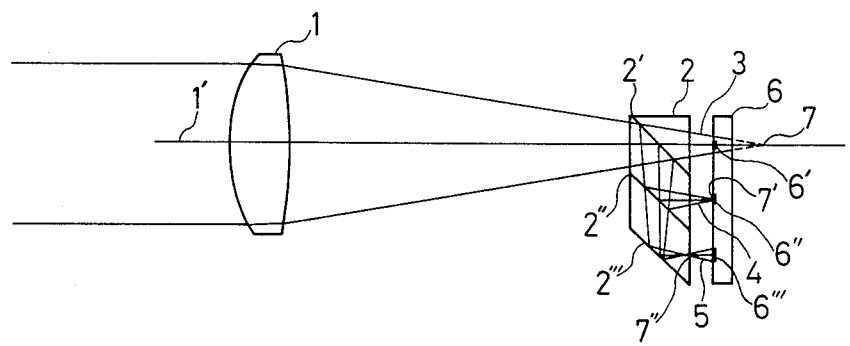

Referring to FIG. 1A, an imaging lens 1 has an optical axis 1'. A beam splitter 2 is arranged in the optical path of the imaging lens 1 and has semi-transmittal sections 2' and 2" and a total reflection section 2"'. Light emerging from the imaging lens 1 becomes incident on the semi-transmittal section 2', and is then divided by the semi-transmittal section 2" and the total reflection section 2"' into three separate light rays 3, 4 and 5. If the semi-transmittal section 2' transmits about one third of the incident light and reflects the remaining two thirds, and the semi-transmittal section 2" transmits about half of the incident light and reflects the remaining half of the incident light, it is apparent that the energy for the three divided light rays 3, 4 and 5 becomes substantially the same. A photoelectric transducer 6 has three light-receiving sections 6', 6" and 6"'.

If the convergent point of the light ray 3 is at point 7, it is easily seen that the convergent points of the divided light rays 4 and 5 are at points 7' and 7", respectively. If the convergent point 7' of the light ray 4 which is reflected and divided by the semi-transmittal sections 2' and 2" coincides with the light-receiving section 6"', the convergent point 7 of the light ray 3 incident on the light-receiving section 6' is located behind the light-receiving section 6', and the convergent point 7" of the light ray 5 incident on the light-receiving section 6"' is located in front of the light-receiving section 6"'. The deviations of these converging points from the light-receiving sections become the same if the distances between the semi-transmittal sections 2' and 2" and between 2" and the total reflection section 2"' are equal to each other. As a result, the sharpness of the image on the light-receiving section 6" becomes maximum, and the sharpnesses of the images on the light-receiving sections 6' and 6"' become low but are similar to each other.

Figure 1B:
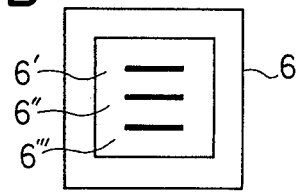
Figure 1C:
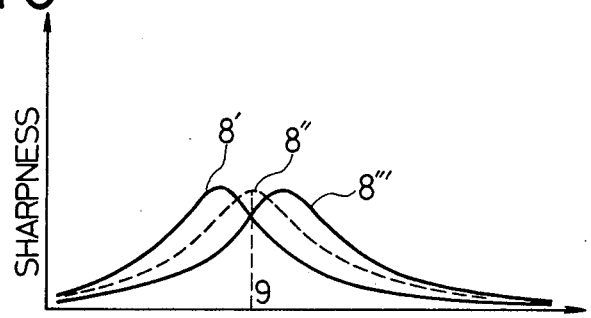

If the imaging lens 1 is displaced along the optical axis 1', the sharpnesses of the images on the light-receiving sections 6', 6" and 6"' change as shown in FIG. 1C. Curves 8', 8" and 8"' representing changes in the sharpnesses of the images on the light-receiving sections 6', 6" and 6"' form peaks in FIG. 1C, wherein the displacement of the imaging lens 1 is plotted as the abscissa and the sharpness is plotted as the ordinate. The condition shown in FIG. 1A corresponds to point 9 shown in FIG. 1C. If the light-receiving surface of the light-receiving section 6" of the photoelectric transducer 6 is arranged to substantially coincide with the predetermined focal plane (the film surface in the case of a camera) of the imaging lens 1, it is detected that the imaging lens 1 is in the in-focus state under the condition shown in FIG. 1A, that is, when the relationships between the sharpnesses of the images on the respective light-receiving sections 6', 6" and 6"' are represented by the point 9 in FIG. 1C. Then, it is apparent from FIG. 1C that the relationships between the sharpnesses 8' and 8"' are inverted according to whether the imaging plane surface of the lens 1 is in front of or behind the light-receiving section 6". In this manner, the near-focus state and the far-focus state can be detected.

FIG. 1B is a front view of the photoelectric transducer 6 wherein the respective light-receiving sections 6', 6" and 6"' comprise, for example, belt-shaped linear CCDs. However, the shape of the light-receiving sections is not necessarily limited to this shape.

Figure 2:
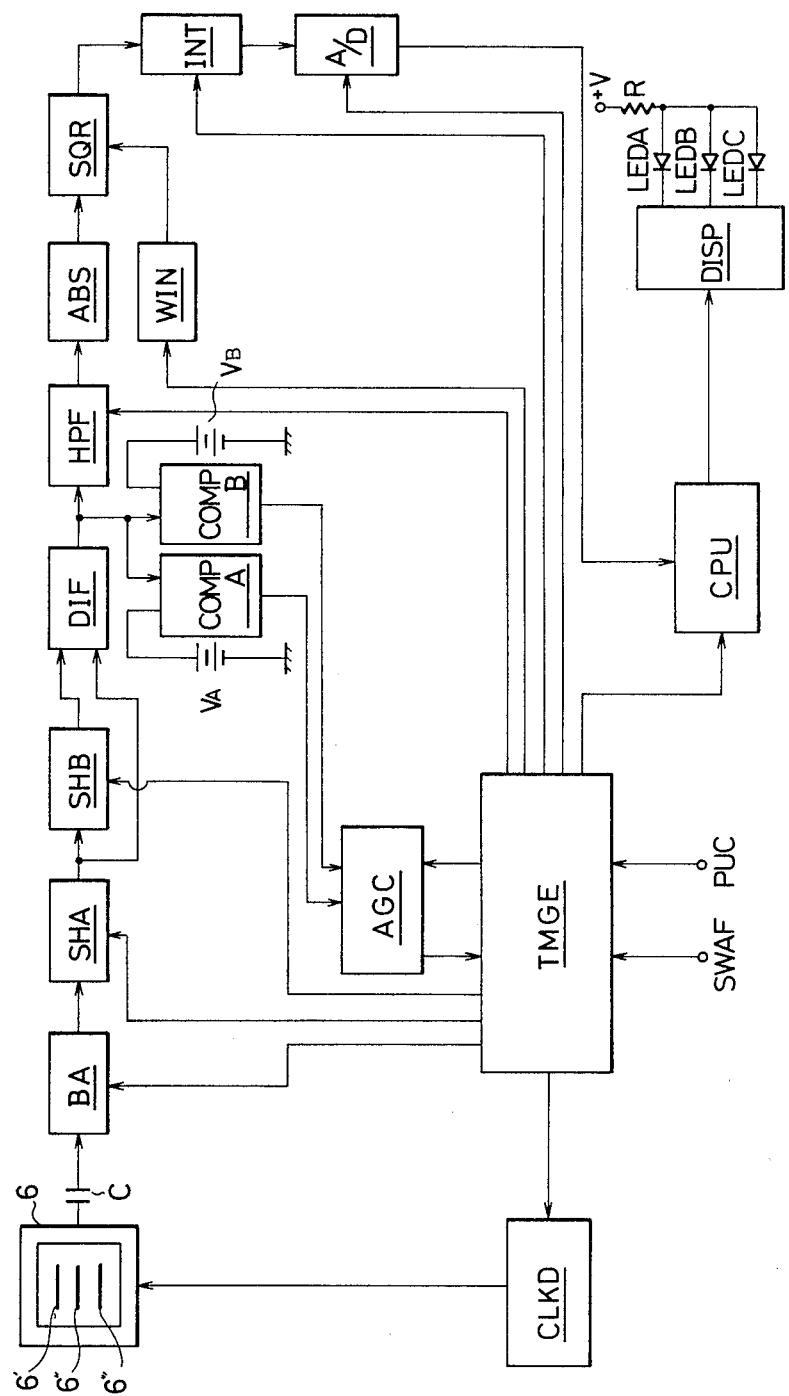
FIG. 2 is a block diagram showing the configuration of electric circuitry of an embodiment in which the improvement of the present invention is applied to a focus detecting system according to the principle shown in FIGS. 1A to 1C.

A focus detecting system is thus obtained which has the beam splitter 2 and the photoelectric transducer 6 with the three light-receiving sections 6', 6" and 6"'. FIG. 2 shows a block diagram of an electric circuit which reads image signals from the light-receiving sections 6', 6" and 6"', extracts sharpness signals, and discriminates the magnitudes of sharpness of the image at three points. Many of the blocks shown in FIG. 2 are of known configuration and details of them are shown in a series of applications as in U.S. patent application Ser. No. 59,635, "Focus Detecting System", Kinoshita et al, filed on July 23, 1979 (corresponding German DOLS No. 29 30 636), U.S. patent application Ser. No. 151,703, "Image Sharpness Detecting System", Kawabata et al, filed on May 20, 1980 (corresponding German patent application No. P 30 19 908.7), and so on. Therefore, only parts which are essentially related to the present invention will be described.

Referring to FIG. 2, the photoelectric transducer 6 shown in FIG. 1 comprises a CCD having the three light-receiving sections 6', 6'' and 6'''. A series of clock signals for operating the CCD 6 are supplied from a clock driver CLKD. These clock signals are supplied to initiate a series of operations of the CCD 6 such as integration, transfer, resetting and so on in a predetermined order. The charge stored for a predetermined period of time in the CCD 6 is charge-voltage converted at the output of the CCD 6 and is thereafter input, as an image signal, to a balance adjusting circuit BA through a capacitor C for suppressing noise. These image signals corresponding to the three light-receiving sections 6', 6''' and 6''' of the CCD 6 are time-serially read out in an order which is determined by the configuration of the CCD 6.

Figure 3:
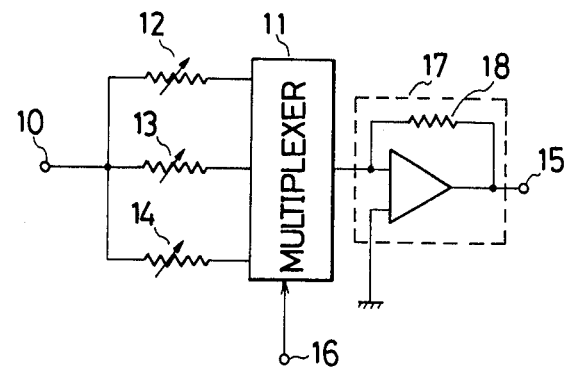
FIG. 3 is a partial circuit diagram showing an example of a balance adjusting circuit shown in the circuitry of FIG. 2.

The balance adjusting circuit BA, as shown in FIG. 3, has a multiplexer 11 of known configuration and three variable resistors 12, 13 and 14. Referring to FIG. 3, the image signal as described above is supplied to the multiplexer 11 through the variable resistors 12, 13 and 14. In response to a synchronizing signal received from a terminal 16, the multiplexer 11 receives the image signals corresponding to the respective light-receiving sections 6', 6''' and 6''' through the variable resistors 12, 13 and 14, respectively, and outputs them to an amplifier 17. The variable resistors 12, 13 and 14 control the balance of the image signals from the light-receiving sections 6', 6'' and 6'''. The outputs from the resistors 12, 13 and 14 are input through the multiplexer 11 to the amplifier 17 where the gains of the respective images are controlled according to their ratios by a feeding resistor 18 and then are input to the next electric circuit. Balance adjustment of the image signals is useful when there is an imbalance in the three light rays 3, 4 and 5 divided by the beam splitter 2. The synchronizing signal is supplied at the terminal 16 from a timing generator TMGE. Although three variable resistors are used in this embodiment, two variable resistors may be used to balance two image signals in relation to the remaining image signal.

Signal processing in this circuitry must be performed according to a series of synchronizing signals which are supplied from the timing generator TMGE. In response to an operation command signal SWAF of the circuitry (a signal generated in synchronism with the depression of a shutter release button to the first position in the case of a camera) and a power clear signal PUC, the timing generator TMGE generates the various synchronizing signals to the respective blocks in the circuitry in a predetermined order. The timing generator TMGE may be of known configuration and need only generate the group of synchronizing signals suitable for the operation of the circuitry of this embodiment. The clock driver CLKD also operates in response to the timing generator TMGE.

The image signals adjusted by the balance adjusting circuit BA are input to a first sampling and holding circuit SHA. The first sampling and holding circuit SHA shapes the image signals from the CCD 6. In response to a sampling pulse from the timing generator TMGE synchronous with the output of the image signals from the CCD 6, the first sampling and holding circuit SHA samples and holds the level of the respective image signals.

The temperature and accumulating time of the CCD are influenced by the dark current since the actual CCD comprises a semiconductor. Therefore, the actual image signal includes the dark current level superposed on the signal corresponding to the actual amount of incident light. Thus, the image signal as it is contains a noise component. Part of the light-receiving section of the CCD is masked with an aluminum mask or the like, and a signal output from this part is considered to be the dark current level. Then, the difference is obtained between the output from the unmasked light-receiving section and the output of the masked part (to be referred to as a dark current bit hereinafter), that is, the dark current level, to thereby remove the influence of the dark current. The dark current bit (not shown) is included at the end of each of the light-receiving sections 6', 6'' and 6''' of the CCD 6, so that this bit is output first. A second sampling and holding circuit SHB samples and holds the output level of these dark current bits. The second sampling and holding circuit SHB receives commands from the timing generator TMGE for holding the output level. A differential amplifier DIF receives the output signal from the sampling and holding circuit SHA and the output signal from the sampling and holding circuit SHB for taking the difference between these two inputs. The image signals obtained as the output of the differential amplifier DIF are signals whose dark current level is cancelled and which correctly correspond to the amount of incident light.

The output of the differential amplifier DIF is input to a high-pass filter HPF and to two comparators COMPA and COMPB. A reference voltage VA is supplied to the comparator COMPA and a reference voltage VB is supplied to the comparator COMPB. These comparators COMPA and COMPB constitute a window comparator.

Figure 4A:
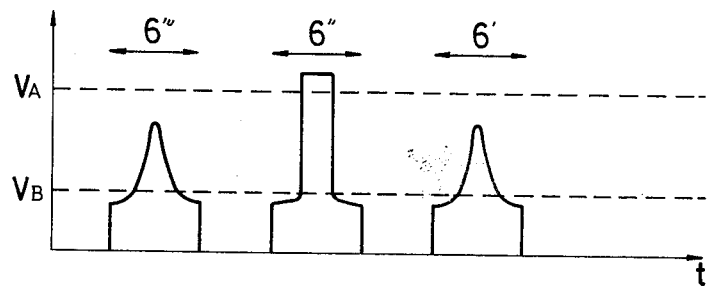
FIGS. 4A to 4C show signal waveforms for explaining the function of a window comparator shown in FIG. 2, which discriminates if the accumulating time is appropriate.
Figure 4B:
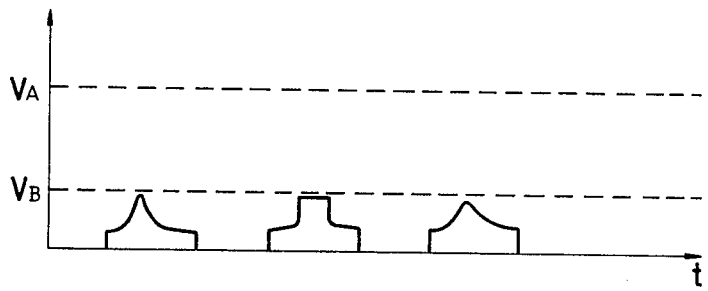
Figure 4C:
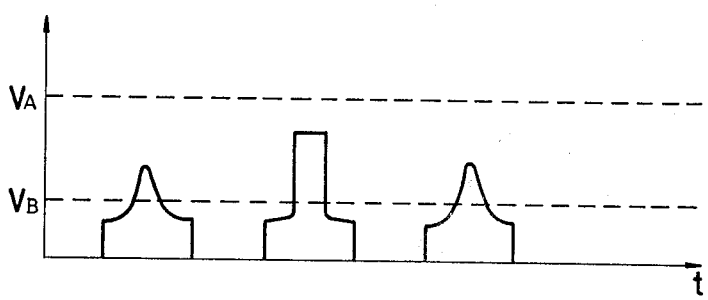

The mode of operation of the window comparator will now be described with reference to FIGS. 4A-4C. FIGS. 4A, 4B and 4C show the relationship between the peak value of the image signal compensated for the dark current level (to be referred to as the dark current-compensated image signal hereinafter) and the reference voltages VA and VB, the time being plotted as the abscissa and the voltage being plotted as the ordinate. The ranges in FIG. 4A indicated by arrows at 6''', 6'' and 6' represent the timings with which the image signals are output from the light-receiving sections 6''', 6'' and 6', respectively. In FIG. 4A, part of the dark currentcompensated signal (part of 6'') exceeds the reference voltages VA and VB, and the signal level is too high. In this case, the outputs of both the comparators COMPA and COMPB are at high level. In FIG. 4B, the dark current-compensated signal is lower than the reference voltage VB and the signal level is too low. In this case, the outputs of both the comparators COMPA and COMPB are at low level. In FIG. 4C, the peak value of the dark current-compensated signal is between the reference voltages VA and VB and is at a suitable level. In this case, only the output of the comparator COMPB is at high level, and the output of the comparator COMPA is at low level. If the reference voltages VA and VB are so selected to set the suitable level of the dark current-compensated signal, the combination of the high or low level of the outputs of the comparators COMPA and COMPB indicates the appropriateness of the dark current-compensated signal level. If VA>VB in this embodiment, when the outputs of both the comparators COMPA and COMPB are at high level, it indicates that the dark current-compensated signal is at too high a level including saturated level. When the outputs of both the comparators COMPA and COMPB are at low level, it indicates that the dark current-compensated signal level is too low. Only when the output of the comparator COMPA is at low level and the output of the comparator COMPB is at high level, does it indicate that the dark current-compensated signal is at a suitable level.

The outputs of the comparators COMPA and COMPB are supplied to a accumulating time control circuit AGC for maintaining the appropriate dark current-compensated signal level by shortening the accumulating time of the CCD 6 when it is too high and by prolonging the accumulating time when it is too low. In response to a synchronizing signal from the timing generator TMGE, the integrating time control circuit AGC operates so that it may be able to discriminate the state of the outputs of the comparators COMPA and COMPB at the timing at which the dark current-compensated signals are output from the light-receiving sections 6', 6" and 6'". Based on the output state of the comparators COMPA and COMPB, the accumulating time control circuit AGC outputs a command signal to shorten or prolong the accumulating time to the timing generator TMGE. In response to the command signal, the timing generator TMGE so operates the clock driver CLKD that the accumulating time of the CCD 6 may be shortened or prolonged at the next output from the CCD 6.

The high-pass filter HPF evaluates the degree of change in the image. The high-pass filter extracts the high frequency components from the image signal as a first step in evaluating the sharpness of the image. The timing generator TMGE supplies to the high-pass filter HPF a synchronizing signal which is synchronous with the timing at which the image signals corresponding to the light-receiving sections 6', 6" and 6'" of the CCD 6 are input. This is to prevent the generation of an output from the light-pass filter HPF which is independent of the sharpness of the image and which is caused by an abrupt change in the signal at the initial period. This synchronizing signal temporarily resets the high-pass filter HPF.

The output of the high-pass filter HPF is supplied to a squaring circuit SQR through an absolute value circuit ABS. The absolute value circuit ABS takes the absolute value of the output from the high-pass filter HPF. Since there may be both a positive and a negative change in the image signal (dark to bright and bright to dark), if the output of the high-pass filter HPF were directly supplied to an integrating circuit INT to be described later, the outputs may cancel each other and the signal representing the sharpness of the image might become zero depending upon the image pattern. The absolute value circuit ABS is incorporated to prevent this. The squaring circuit SQR may utilize, for example, nonlinear input/output characteristics of a semiconductor. The function of the squaring circuit SQR in this circuitry is to emphasize and evaluate the peak output of the high-pass filter HPF, that is, the state wherein the change of the image signal with time is great and the sharpness is high. The squaring circuit SQR incorporates a window function generating circuit WIN. This is to prevent, by lowering the weight for evaluation of the sharpness of the image near the edge of the field of view, the introduction of errors in the normal evaluation of the sharpness when an image outside the field of view enters inside the field of view as part of the out-of-focus image. This is also to prevent the introduction of transient error when another image enters the field of view due to blurring of the image formed by the imaging lens 1. The output of the window function generating circuit WIN controls the gain of the squaring circuit SQR so that it may become low at the edge of the field of view and become high at the center. Thus, in response to the timing signal from the timing generator TMGE synchronous with the initiation of operation of the light-receiving sections 6', 6" and 6'" of the CCD 6, the window function generating circuit WIN controls the gain of the squaring circuit according to the relationship determined in correspondence with the location (location in the field of view).

The output of the squaring circuit SQR including the emphasized sharpness data is input to the integrating circuit INT which performs integration for the entire area of the light-receiving sections and outputs the sharpness of the image at each of the light-receiving sections. A synchronizing signal is also supplied from the timing generator TMGE to the integrating circuit INT so that integration and integration resetting may be performed at the timings corresponding to the light-receiving sections 6', 6" and 6'". In this manner, the output of the integrating circuit INT corresponds to the electric output such as the sharpness of the respective images corresponding to the order of output from the light-receiving sections 6', 6" and 6'" of the CCD 6.

The analog output of the integrating circuit INT is input to an A-D converting circuit A/D for conversion into a digital value so that the signal processing may be facilitated for discrimination at a central processing unit CPU of an in-focus state, a near-focus state, and a far-focus state of the imaging lens 1.

FIGS. 5A–5F show the output waveforms of the respective blocks of the circuitry in order to clarify the analog processing of the series of signals representing the sharpness of the image, starting from the read-out of the image signal from the light-receiving sections 6', 6" and 6'" of the CCD 6 (the field of view for the three images) until the integration at the integrating circuit INT. In FIGS. 5A–5F, time is plotted as the abscissa and the voltage or current output is plotted as the ordinate in arbitrary units. The ranges indicated at arrows 6', 6" and 6'" in FIG. 5 represent the timings with which the signals corresponding to the light-receiving sections 6', 6" and 6'" of the CCD 6 are output and processed. The state of the respective images corresponds to the in-focus state of the imaging lens 1 in which the sharpness of the image of the light-receiving section 6" is highest, that is, the sharpness as shown at 9 in FIG. 1C is highest. FIG. 5 shows the state of the signal output from the CCD 6 only once, but these signals are repeatedly output in practice.

Figure 5A:
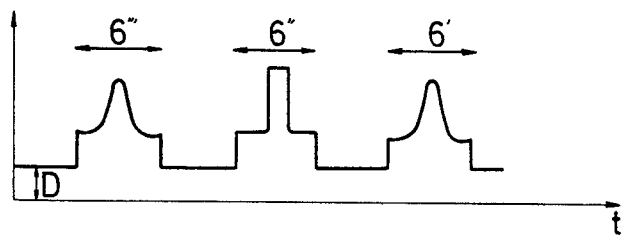
FIGS. 5A to 5F show output waveforms of the outputs of the main blocks of the circuitry shown in FIG. 2.
Figure 5B:
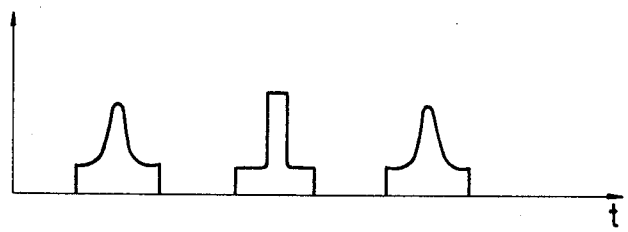
Figure 5C:
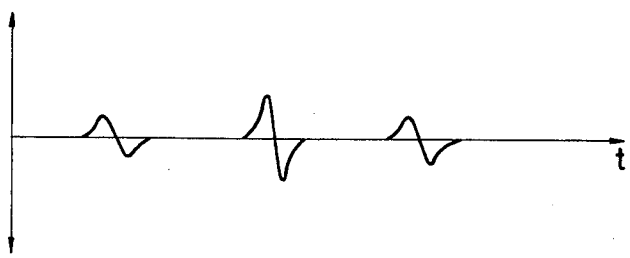
Figure 5D:
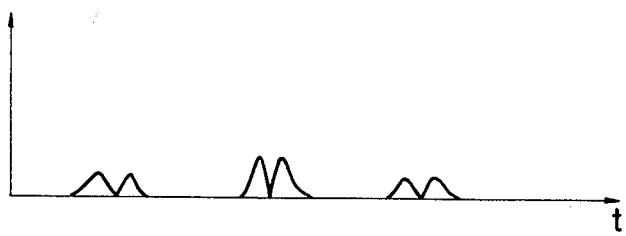
Figure 5E:
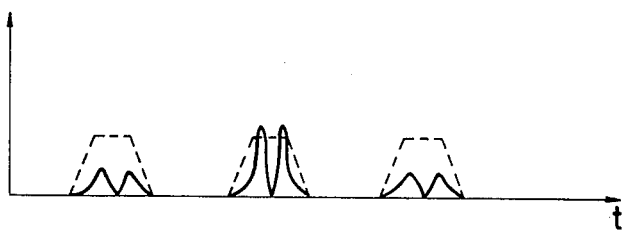
Figure 5F:
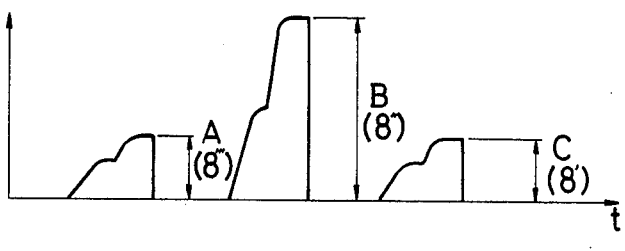

FIG. 5A shows the image signal which is output from the CCD 6 and has passed through the sampling and holding circuit SHA. The order for output of the images from the light-receiving sections is 6'", 6" and 6'. The voltage indicated by letter D is the dark current level, which is first output and is held by the sampling and holding circuit SHB. FIG. 5B shows the output of the differential amplifier DIF, that is, the dark current-compensated signal in which the dark current level D is cancelled. FIG. 5C shows the output of the high-pass filter HPF. FIG. 5D shows the output of the absolute value circuit ABS. FIG. 5E shows the output of the squaring circuit SQR, wherein the trapezoids indicated by the broken lines show the manner in which the gain of the squaring circuit SQR changes within the field of view according to the shape of the window generated by the window function generating circuit WIN described above. FIG. 5E shows the output of the integrating circuit INT wherein levels A(8'''), B(8'') and C(8') correspond to the sharpnesses of the images on the light-receiving sections 6''', 6'' and 6', respectively. Specifically, A, B and C in FIG. 5F correspond to the levels of the curves 8''', 8'' and 8' of FIG. 1C at the point 9.

The levels A, B and C are converted into digital data by the A-D converting circuit A/D described above and are input to the central processing circuit CPU. The CPU computes the relationships among the levels A, B and C according to the conditions of the in-focus state, the near-focus state, the far-focus state, and the interruption of the discrimination which are set in advance. Basically, in the in-focus state, conditions $B > A$, $B > C$ and $A = C$ are satisfied. In the near-focus state, condition $C > A$ is satisfied, and in the far-focus state, condition $A > C$ is satisfied. The CPU discriminates which set of conditions is satisfied and outputs a signal corresponding to one of these three states. As the algorithm for the discrimination at the CPU may be adopted the algorithm as disclosed in U.S. patent application Ser. No. 151,533, "Focus Detecting System", Sakai et al, filed on May 19, 1980 (corresponding German patent application No. P 30 19 901.0) of the same assignee or in the U.S. patent application which is to be filed on Oct. 16, 1981 by Shinji Sakai, Nobuhiko Shinoda, Takao Kincshita, Kazuya Hosoe and Takashi Kawabata (corresponding Japanese patent application No. 144,782/1980).

The output of the central processing circuit CPU is input to the display circuit DISP. The display circuit DISP basically comprises a logic circuit and a drive circuit for driving indicators such as LEDs. In accordance with the commands from the central processing circuit CPU, in this embodiment, the display circuit DISP lights up the light-emitting diode LEDB in the case of in-focus state, and lights up the light-emitting diodes LEDC and LEDA, respectively, in the cases of near-focus and far-focus states to indicate that the imaging lens 1 is in the in-focus, near-focus or far-focus state. A protective resistor R is incorporated to protect the LEDA to LEDC when a voltage V is supplied to them. Although LEDs are used in this embodiment, liquid crystal display devices, electrochromies or the like may be used.

Figure 9:
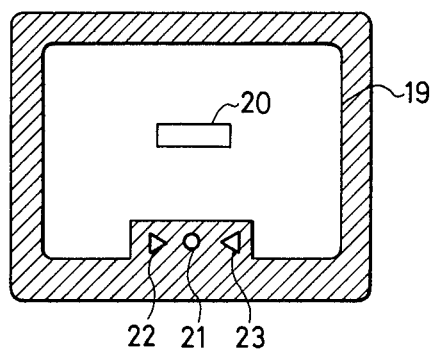
FIG. 9 shows an example of a display when the focus detecting system according to the present invention is applied to the camera.

FIG. 9 shows a focus detection display suitable for focusing of the photographic lens of a camera, which involves a range finder field frame 19 of the camera, a field mark 20 representing the location of the field of view, and a mark 21 representing the in-focus state of the photographic lens. The light-emitting diode LEDB shown in FIG. 2 is arranged immediately behind the mark 21. Arrow marks 22 and 23 (arrows represent the direction of rotation of a distance dial of the photographic lens for relocating it from the out-of-focus position to the in-focus position) represent the near-focus state and the far-focus state, respectively. The light-emitting diodes LEDC and LEDA shown in FIG. 2 are arranged immediately behind the arrow marks 22 and 23, respectively. In this manner, the operator is capable of confirming the focusing state of the photographic lens simply by observing which one of these marks is lit. If the mark 21 representing the in-focus state is lit, the focusing operation is complete. If the arrow mark 22 or 23 is lit, the distance dial need only be rotated in the direction indicated by the arrow mark 22 or 23, respectively, until the in-focus mark 21 is lit.

The configuration of the timing generator TMGE will be described with reference to FIGS. 6 and 7.

Figure 6:
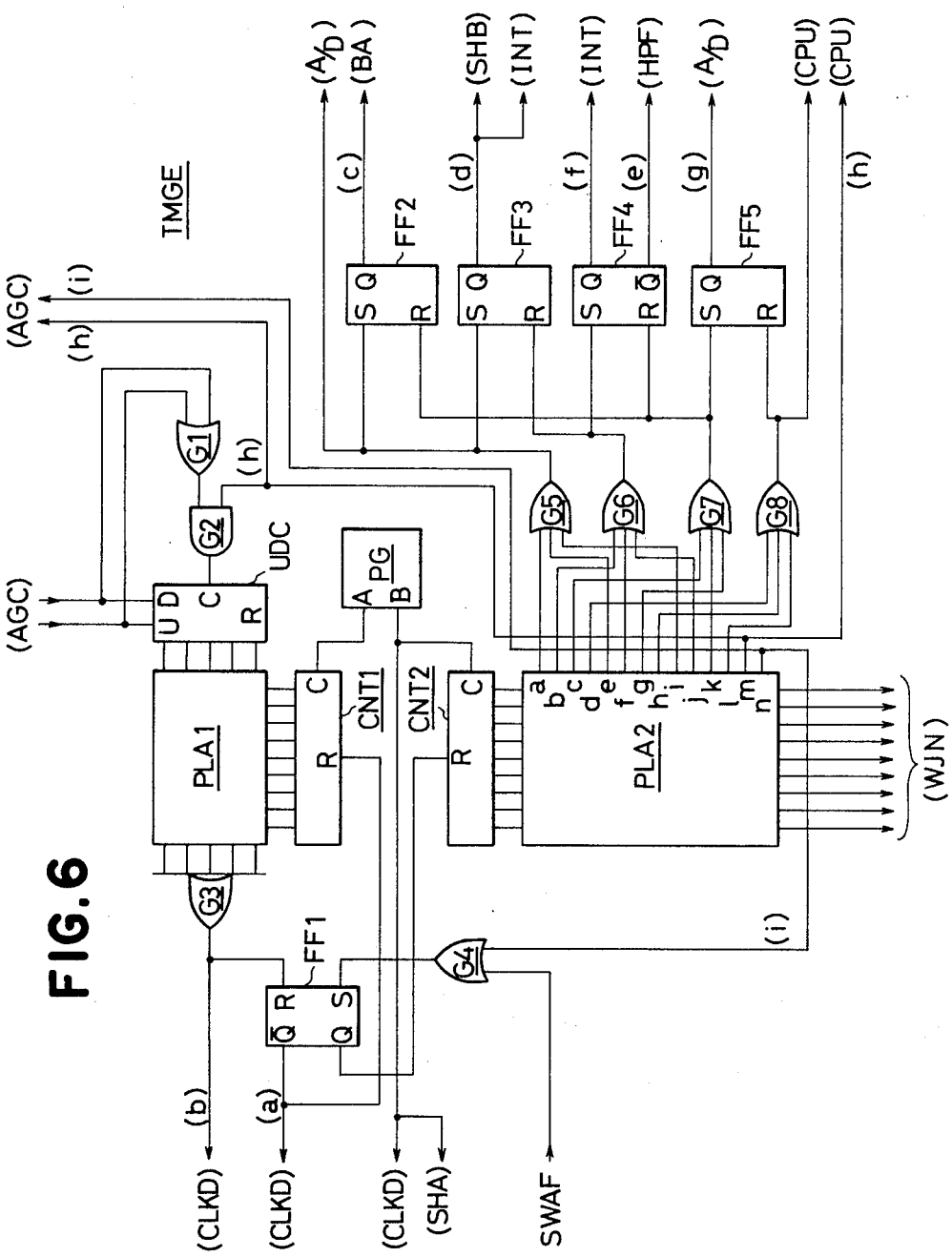
FIG. 6 is a block diagram showing the configuration of a timing generator in the circuitry shown in FIG. 2.
Figure 7:
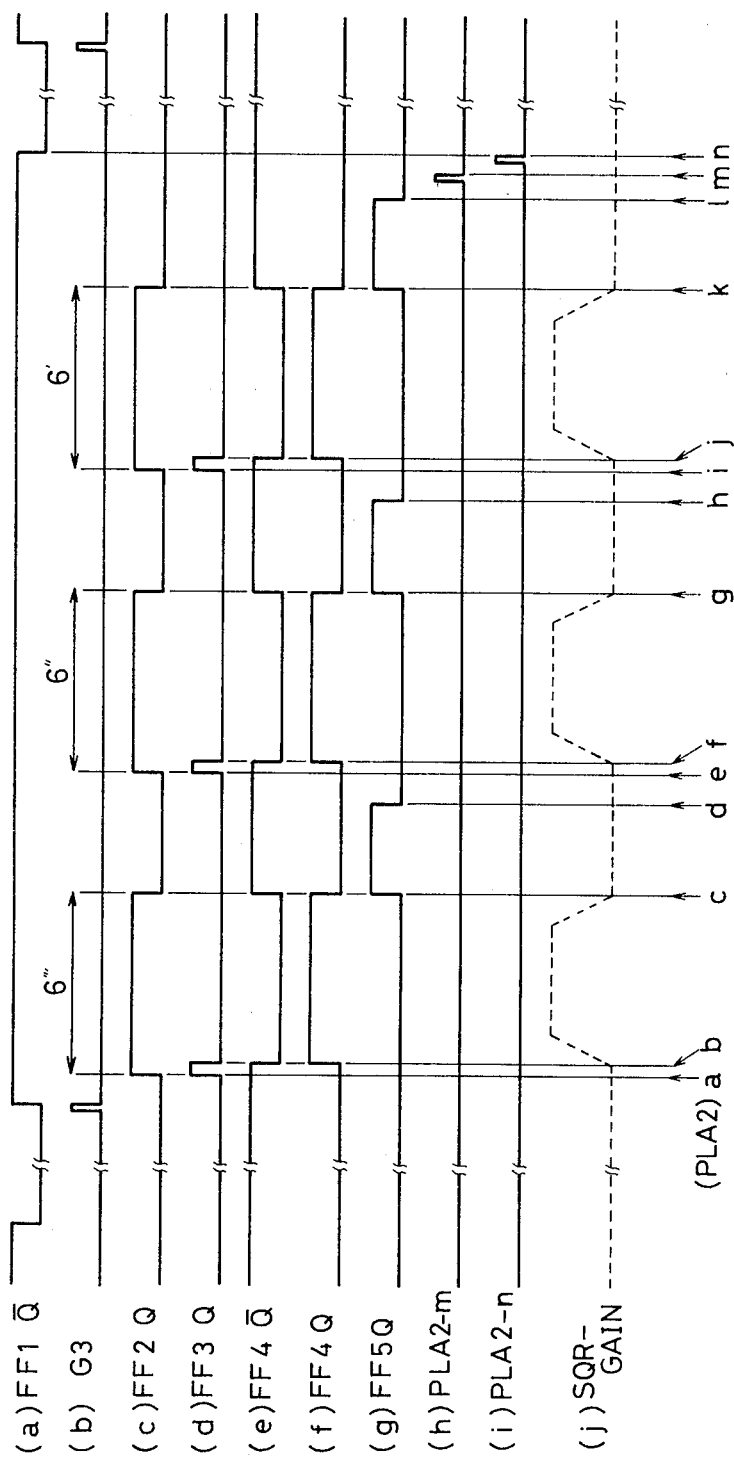
FIG. 7 is a timing chart showing timing signals for controlling various operations which are output from the timing generator shown in FIG. 6.

Referring to FIG. 6, the part of the circuitry consisting of an up/down counter UDC, a counter CNT1, a programmable logic array PLA1, and Gate G2 and OR gates G1 and G3 mainly serves to regulate the accumulating time of the CCD 6. The up/down counter UDC is set in the up-counting mode in response to an accumulating time shortening command from the accumulating time control circuit AGC and is set in the down-counting mode in response to an accumulating time prolonging command therefrom. The up/down counter UDC is so controlled to count one pulse at a predetermined timing to be described later to set a different accumulating time only if an accumulating time change command is output from the accumulating time control circuit AGC. The CNT1 counts a pulse train A from a pulse generator PG. When the count of the counter CNT1 reaches a predetermined value which is set by the output of the up/down counter UDC, the programmable logic array PLA1 generates a timing pulse which is output through the OR gate G3. The output of the OR gate G3 is supplied to the clock driver CLKD, in response to which the clock driver CLKD generates a start pulse (shift pulse) for initiating the output of the signals from the CCD 6. The start pulse is supplied to the CCD 6. The output waveform of the OR gate G3 is as shown in FIG. 7(b).

An RS flip-flop FF1 generates a control signal to the clock driver CLKD to normally set the CCD 6 in the clear condition and to release the clear condition only during the period in which signal integration is required. The RS flip-flop FF1 is set by the operation command signal SWAF described above which is supplied through an OR gate G4 or a pulse signal for repetition of the operation which is generated at a predetermined timing to be described later. The RS flip-flop FF1 is reset by the output of the OR gate G3. The $\overline{Q}$ output of the RS flip-flop FF1 as shown in FIG. 7(a) is supplied as a control signal to the clock driver CLKD. The CCD 6 has an overflow drain gate which is opened or closed according to the $\overline{Q}$ output of the RS flip-flop FF1 (the gate is opened when the $\overline{Q}$ output is at high level and is closed when it is at low level) to thereby control the integration of the signal charge by the CCD 6. The interval shown in FIG. 7(a) in which the $\overline{Q}$ output of the RS flip-flop FF1 is at low level corresponds to the accumulating time of the signal charge, which is defined as an interval from the predetermined timing of setting the RS flip-flop FF1 to the generation of the pulse from the OR gate G3. Since the timing at which the pulse is generated from the OR gate G3 is regulated by the output from the up/down counter UDC, the accumulating time of the signal charge of the CCD 6 is regulated by the output of the up/down counter UDC. The $\overline{Q}$ output of the RS flip-flop FF1 is supplied to the counter CNT1 as a reset signal. Therefore, the counter CNT1 performs counting only during the interval in which the $\overline{Q}$ output of the flip-flop FF1 is at low level and is kept reset in other conditions.

The circuitry part consisting of a counter CNT2, a programmable logic array PLA2, OR gates G5 to G8, and RS flip-flops FF2 to FF5 mainly serves to control the respective parts and the overall sequence of the circuit shown in FIG. 2. The counter CNT2 counts a pulse train B from the pulse generator PG. In this embodiment, the CCD 6 is of single-phase driven type. The pulse train B is also supplied to the clock driver CLKD which generates from the pulse train B a drive clock pulse (transfer clock pulse) to be supplied to the CCD 6. The count of the counter CNT2 and the drive (transfer of the charge) are in one-to-one correspondence. The pulse train B is also supplied to the sampling and holding circuit SHA as the sampling pulse. The content of the programmable logic array PLA2 is so programmed that, based on the count output from the counter CNT2, pulses are generated from terminals a to n at the respective timings shown in FIGS. 7(a) to 7(n) after the pulse is generated from the OR gate G3. In response to the outputs from the terminals a, e and i of the programmable logic array PLA2, the OR gate G5 produces an output which is supplied to the set terminals of the RS flip-flops FF2 and FF3. In response to the outputs from the terminals b, f and j of the programmable logic array PLA2, the OR gate G6 produces an output which is supplied to the reset terminal of the RS flip-flop FF3 and the set terminal of the RS flip-flop FF4. In response to the outputs from the terminals c, g and k of the programmable logic array PLA2, the OR gate G7 produces an output which is supplied to the reset terminals of the RS flip-flops FF2 and FF4 and to the set terminal of the RS flip-flop FF5. In response to the outputs from the terminals d, h and l of the programmable logic array PLA2, the OR gate G8 produces an output which is supplied to the reset terminal of the RS flip-flop FF5. The Q outputs of the RS flip-flops FF2 to FF5 and the $\overline{Q}$ output of the RS flip-flop FF4 are shown in FIGS. 7(c) to 7(g) as contrasted with the timings (shown in FIG. 7(b)) at which the signals are output from the respective light-receiving sections 6''', 6'' and 6' of the CCD 6. The Q output (FIG. 7(c)) of the RS flip-flop FF2 is supplied to the balance adjusting circuit BA. The high level interval of the Q output (FIG. 7(d)) of the RS flip-flop FF3 corresponds to the dark current bit at the end of each of the outputs of the light-receiving sections 6''', 6'' and 6', and is supplied to the sampling and holding circuit SHB as a sampling pulse. The Q output of the RS flip-flop FF3 is also supplied to the integrating circuit INT as a reset signal. The low level interval of the $\overline{Q}$ output (FIG. 7(e)) of the RS flip-flop FF4 corresponds to the effective image signal bit of the outputs of each of the light-receiving sections 6''', 6'' and 6', and is supplied to the high-pass filter HPF as a reset signal. In this manner, the high-pass filter HPF is released from the reset condition only during the low level interval of the $\overline{Q}$ output of the RS flip-flop FF4. The Q output (FIG. 7(f)) of the RS flip-flop FF4 is supplied to the integrating circuit INT as an integration command signal. The Q output (FIG. 7(g)) of the RS flip-flop FF5 is supplied to the A-D converting circuit A/D as an A-D conversion command. The output of the OR gate G5 is supplied to the A-D converting circuit A-D as a reset signal. The output of the OR gate G3 is supplied to the central processing circuit CPU as a strobe pulse for storing the output from the A-D converting circuit A/D. The output (FIG. 7(h)) from the terminal m of the programmable logic array PLA2 is supplied to the AND gate G2 as a count pulse of the up/down counter UDC as well as to the accumulating time control circuit AGC and the central processing unit CPU as a latch pulse for latching the outputs thereof. The output (FIG. 7(i)) from the terminal n of the programmable logic array PLA2 is supplied to the OR gate G4 as a set signal of the RS flip-flop FF1 as well as to the accumulating time control circuit AGC as a reset signal for the flip-flop therein. The Q output of these flip-flop FF1 (the inverted signal of the $\overline{Q}$ output shown in FIG. 7(a)) is supplied to the counter CNT2 as a reset signal. If the counter CNT1 is in the count-enabling mode, the counter CNT2 is placed under the reset condition. If the counter CNT1 is under the reset condition, the counter CNT2 is set in the count-enabling mode. The count of the counter CNT2 is output to the window function generating circuit WIN. In response to the count output from the counter CNT2, the window function generating circuit WIN performs gain control so that the gain of the squaring circuit SQR changes as shown in FIG. 7(j). The window function generating circuit WIN may be of the configuration as disclosed in U.S. patent application Ser. No. 151,703, filed on May 20, 1980 by Kawabata et al (corresponding German patent application No. P 30 19 908.7) of the assignee of the present invention.

Figure 8:
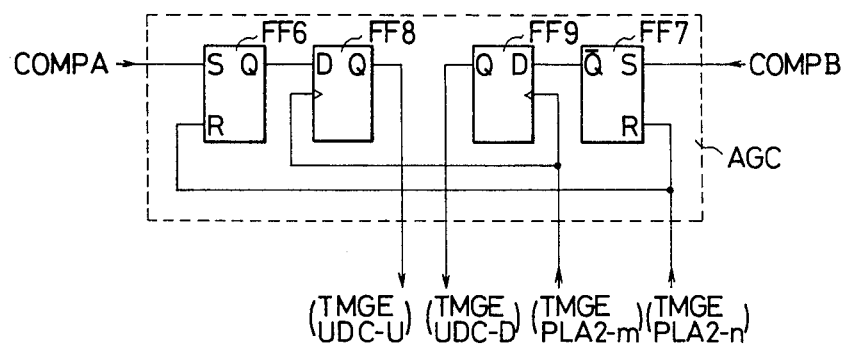
FIG. 8 is a block diagram showing the configuration of the accumulating time control circuit in the circuitry shown in FIG. 2.

Describing next the configuration of the accumulating time control circuit AGC, referring to FIG. 8, an RS flip-flop FF6 is set by an output of high level of the comparator COMPA, and an RS flip-flop FF7 is set by an output of high level of the comparator COMPB. Both of these RS flip-flops FF6 and FF7 are reset by an output (FIG. 7(i)) of high level from the terminal n of the programmable logic array PLA2 in the timing generator TMGE shown in FIG. 6. In response to an output (FIG. 7(h)) of high level from the terminal m of the programmable logic array PLA2 in the timing generator TMGE, a D flip-flop FF8 latches the Q output of the RS flip-flop FF6, and a D flip-flop FF9 latches the $\overline{Q}$ output of the RS flip-flop FF7. A high level of the Q output from the D flip-flop FF8 represents the shortening of the accumulating time, and a high level of the Q output of the D flip-flop FF9 represents the prolongation of the accumulating time. These outputs are supplied to count mode setting terminals U and D of the up/down counter UDC in the timing generator TMGE shown in FIG. 6.

An embodiment of the focus detecting system as described above according to the improvement of the present invention which is adaptable to imaging optical systems of different specifications will now be described.

Figure 10A:
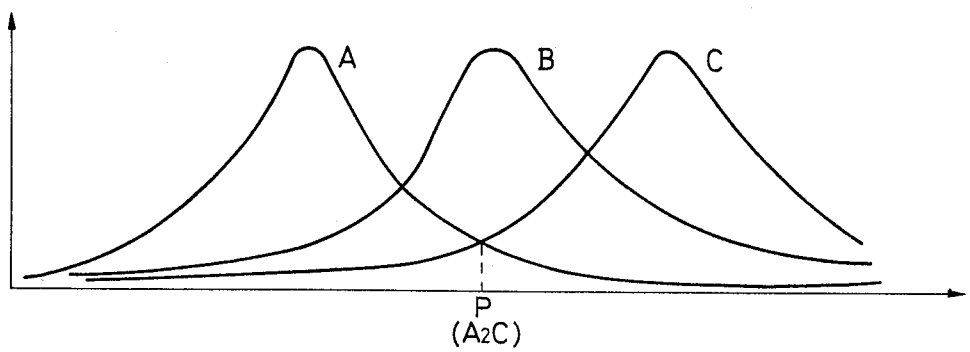
FIGS. 10A and 10B show the signal waveforms for explaining an example of a method for changing the acceptable in-focus range according to the present invention.
Figure 10B:
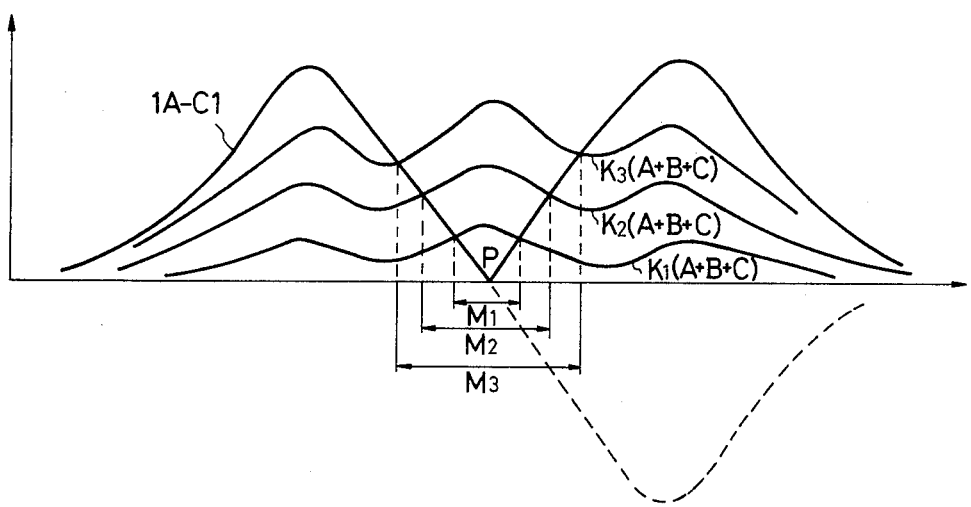

FIGS. 10A and 10B show an embodiment of a method of changing the acceptable in-focus range. FIG. 10A shows focus detection signals A, B and C which correspond to FIG. 1C and which have values of the curves 8', 8'' and 8''' shown in FIG. 1C corresponding to the extended position of the imaging lens 1. At point P, the in-focus state is achieved wherein A=C. FIG. 10B shows the manner in which $|A-C|$ changes. At the in-focus point P, $|A-C|=0$. The values of the focus detection signals A, B and C vastly change depending upon the brightness, contrast, and pattern of the object. Therefore, if the acceptable in-focus range is determined according to $|A-C|<K$ (where K is a constant), the acceptable in-focus range vastly changes according to the conditions of the object as described above. In order to avoid this, in this embodiment, the acceptable in-focus range is determined according to $|A-C| < K(A+B+C)$. In this manner, it is apparent that the fluctuation depending upon the conditions of the object can be compensated for. That is to say, $|A-C|$ representing in-focus range is normalized on the basis of $A+B+C$ changing depending upon the brightness, contrast and pattern of the object. FIG. 10B shows a graph of $K(A+B+C)$ when K is varied in the right side of the equation above. As may be seen from this graph, an acceptable in-focus range M1 is obtained when $|A-C| < K1(A+B+C)$ is satisfied. Acceptable in-focus ranges M2 and M3 are obtained with corresponding K2 and K3. It is seen from this that the acceptable in-focus range is changed by varying K.

The function of determining the acceptable in-focus range can be accomplished, e.g., by adding an electrical element such as an ROM in the central processing circuit CPU shown in FIG. 2. In this case, the changing of the acceptable in-focus range can be performed by changing the operation mode of the central processing circuit CPU.

FIGS. 11A and 11B show an embodiment of the means for changing the acceptable in-focus range among four steps, in connection with the central processing circuit CPU. FIG. 11A shows the method in which the acceptable in-focus range is changed by combinations of potentials at two terminals A and B connected to parts of the operational system of the central processing circuit CPU. The terminals A and B are normally kept at a constant potential (to be referred to as level "1") by pull-up resistors 24 and 26. However, when switches 25 and 27 are closed, the potential of the terminals A and B drops to zero (to be referred to as level "0"). Therefore, the acceptable in-focus range can be changed by opening or closing the switches 25 and 27 by suitable means. FIG. 11B shows the combinations of the conditions of the switches 25 and 27, and the resultant acceptable in-focus range $\Delta$. The values of the range $\Delta$ may correspond to F numbers F1, F2, F4 and F8. It is to be noted that the values of the range $\Delta$ can be changed by suitably setting the constant in the central processing circuit CPU.

FIG. 12 shows an embodiment having a digital switch for changing the acceptable in-focus range by a rotary switch mounted to, for example, a camera. FIG. 12A shows a rotary dial 28 having indices of the acceptable in-focus range. The rotary dial 28 rotates around a shaft 29, having a fixed mark, in the arrow directions. FIG. 12B shows the construction of a digital switch. Rings 28' and 28" having conductor patterns rotate around the shaft 29 with the dial 28, while contacting terminals A and B, to thereby generate digital signals as shown in FIG. 11B. The cross-hatched part indicated by numeral 30 is at the ground potential, and the other parts are at level "1".

Figure 13A:
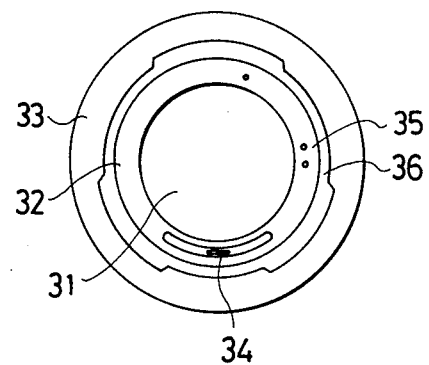
FIGS. 13A and 13B show other examples of the means for changing the acceptable in-focus range of a camera as shown in FIGS. 11A and 11B.
Figure 13B:
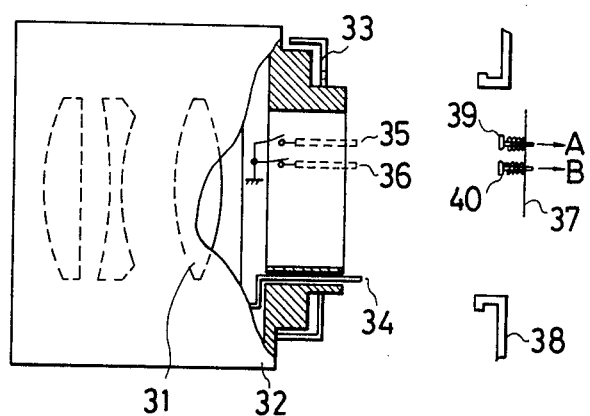

FIGS. 13A and 13B show an example wherein the changing of the acceptable in-focus range is automatically performed upon mounting the photographing lens to a camera. In this example, the acceptable in-focus range can be changed in accordance with the focal length of the lens and/or the open F number. For example, it is possible to narrow the acceptable in-focus range for a lens of short focal length and small F number (brighter lens), and to widen the acceptable in-focus range for a lens of long focal length and relatively great F number (darker lens). FIG. 13A shows a mounting section of a lens. A lens barrel 32 holds an optical system 31. The mounting section also includes mount clamp rings 33, an aperture signal pin 34, and signal pins 35 and 36 for transmitting the specifications of the lens. FIG. 13B shows how the acceptable in-focus range is varied upon coupling of the lens and the camera main body. The signal pins 35 and 36 are grounded with respect to the lens barrel 32 so that the acceptable in-focus range can be determined according to the focal length and the open F number of the lens. In this example, only the pin 36 is grounded. When mounting the lens to a mounting section 38 at the side of the camera main body 37, signal pins 39 and 40 at the camera main body 37 side and the signal pins 35 and 36 of the lens side engage with each other. In this case, the terminal A is at level "1" and the terminal B is at level "0", establishing the acceptable in-focus range F2 in FIG. 11B.

Figure 14A:
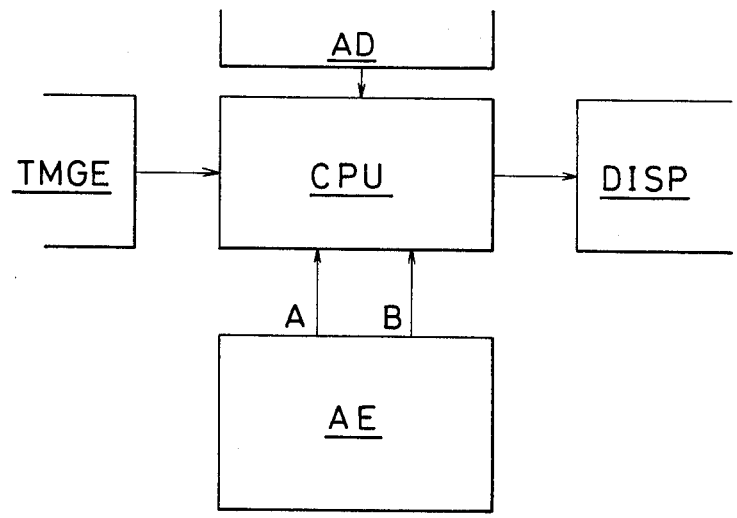
FIGS. 14A and 14B show examples of change of the acceptable in-focus range according to photographing aperture data in a camera.

FIG. 14A is a view for explaining the principle for determining the acceptable in-focus range by inputting aperture data for the photographing operation to the central processing circuit CPU from an automatic exposure control system AE. The combinations of "1" and "0" at the terminals A and B are input to the central processing circuit CPU from the automatic exposure control system AE, in forms corresponding to the aperture value.

Figure 14B:
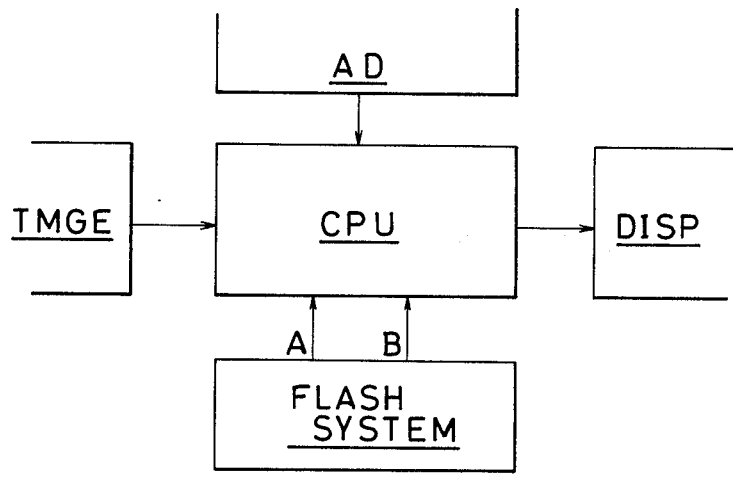

FIG. 14B shows an example wherein the photographing aperture data in flash photography is input to the central processing circuit CPU as in the case described above. When the flash system constitutes a part of the automatic exposure control system, the overall system is mixed with that shown in FIG. 14A.

Figure 15A:
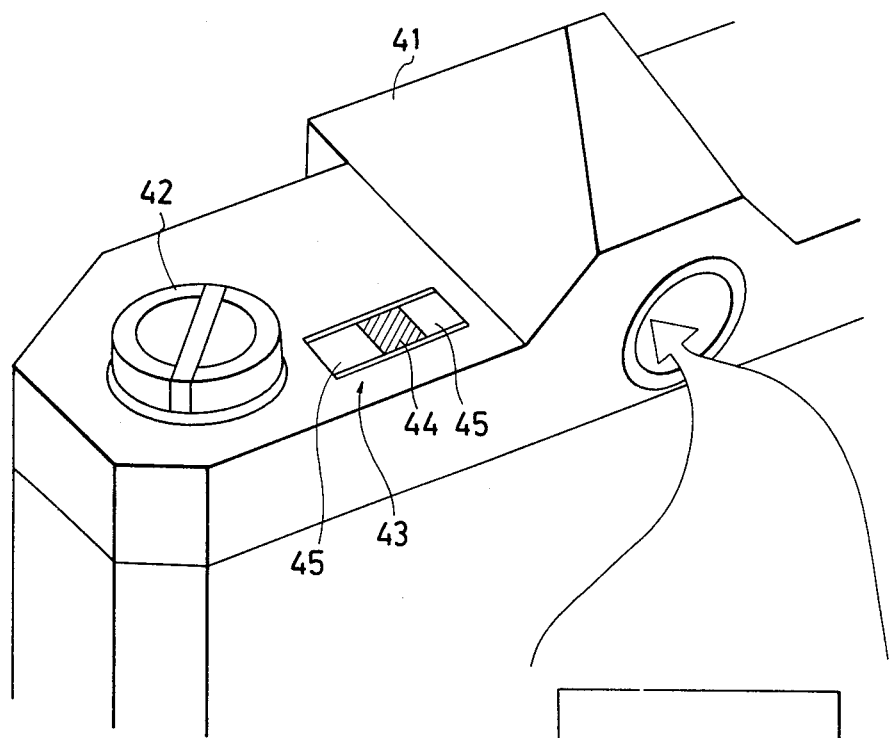
FIG. 15A and 15B show examples of display of the acceptable in-focus range in a camera.
Figure 15B:
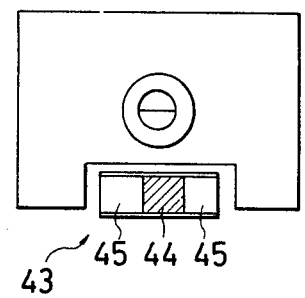

FIGS. 15A and 15B show an example of displaying the acceptable in-focus range of the focus detecting system applied to a camera and specifically shows an embodiment of a display within the range finder or another part of the camera. FIG. 15A shows a case wherein an analog display means 43 utilizing a liquid crystal device or an electrochromy is arranged in the vicinity of a rewinding lever 42 of a typical single lens reflex camera 41. In this case, the focused range is displayed as a nontransparent part 44 to provide a distinguishable contrast with respect to a transparent part 45, thereby indicating the width of the acceptable in-focus range. When the width of the acceptable in-focus range is narrow, it becomes critical to produce the nontransparent part by the focusing operation (LEDB is lit in the example shown in FIG. 2), assuring higher focusing precision. When the allowable focusing range is wide, the nontransparent part is easily produced and the operation is facilitated. FIG. 15B shows a case wherein this display is in the range finder.

Figure 16:
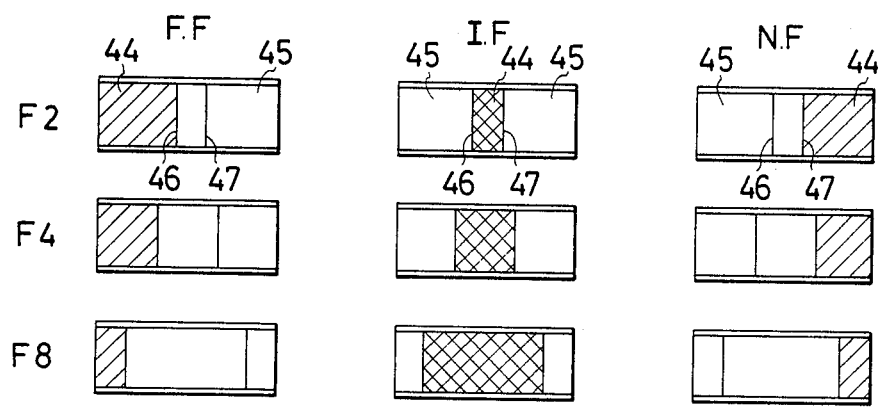
FIG. 16 shows examples of display of the in-focus state, the near-focus state and the far-focus state by the display means for displaying the acceptable in-focus range shown in FIG. 15.

FIG. 16 shows the acceptable in-focus ranges when the F numbers are F2, F4 and F8 for the far-focus state (FF), the in-focus state (IF) and the near-focus state (NF). Where the F number is at F2 and the focusing state is at FF, the nontransparent part 44 is at the left side of lines 46 and 47 which define the acceptable in-focus range in the display, thus indicating the far-focus state. Where the F number is at F2 and the focusing state is at IF, the nontransparent part 44 is moved to the central narrow part, thus indicating the in-focus state. Where the F number is at F2 and the focusing state is at NF, the nontransparent part 44 is at the right end and indicates the NF state. The lines 46 and 47 are not necessarily visible, depending upon the display material adopted. In case of the F number of F4 or F8, the space between the lines 46 and 47 widens and it is seen that the acceptable in-focus range is wider.

For performing the display as described above, the indicators for three zones are operated, e.g., by the signals NF, IF and FF from CPU in FIG. 2. The indicators may consist of small elements so that the widths of the zones can be varied according to the combination of the levels of the terminals A and B corresponding to the operation of the switch. A group of these small elements may be operated for one zone according to the combination of the terminals A and B.

According to this embodiment of the present invention, it is not only possible to change the acceptable in-focus range according to the taste of the user, the conditions of the lens used and so on, but it is also possible to visually confirm the range within or outside of the camera as needed. This is very useful for a camera having the above-mentioned focus detecting system.

Another embodiment of the present invention will now be described wherein the focus detecting system is adaptable to various specifications of the optical system by controlling the substantial field of view (field of view of detection) of a focus detecting system of TTL type according to the specifications of the optical system involved.

Figure 17:
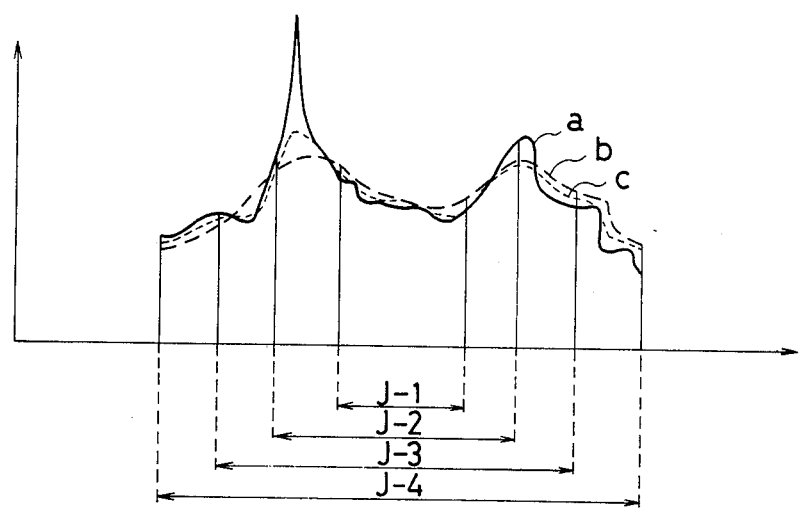
FIG. 17 shows signal waveforms for explaining an example of a method for changing the field of view of detection according to the present invention.

FIG. 17 shows image signals, in superposition, from the light-receiving sections 6', 6" and 6''', which are compensated for the dark current shown in FIG. 5B. The respective image signals are represented by curves a, b and c. With the curve a, the sharpness is highest, and with curves b and c, the sharpness is lower. Among fields of view of detection J-1, J-2, J-3 and J-4, the field of view of detection J-4 is widest and becomes narrower in the order of J-3, J-2 and J-1. In this embodiment, the range of these fields of view of detection is automatically or manually changed according to the focal length of the photographing lens. In general, the interchangeable lenses for single lens reflex cameras have a wide range, from short to long focal lengths. Therefore, if the size of the light-receiving section is fixed as the field of view of detection, the field of view is too wide for a lens of short focal length, and far objects and near objects are both present in the field of view. This results in competition between far and near objects, resulting in erratic operation. When a lens of long focal length is used, only a limited part of the object enters the field of view of detection due to a narrow angle of view. This frequently results in that only a low contrast or solid image enters the field of view. In addition to this, the image in the field of view tends to enter or leave the field of view by camera shake or the like, and unstable operation is caused. Therefore, it is better to set the field of view of detection J-1 for the lens of short focal length and to set the field of view of detection J-4 for the lens of long focal length.

Figure 18A:
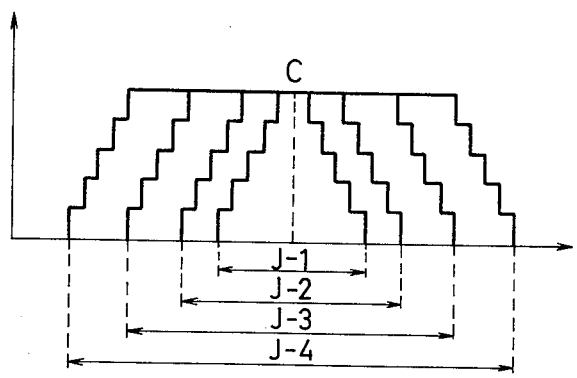
Figure 18B:
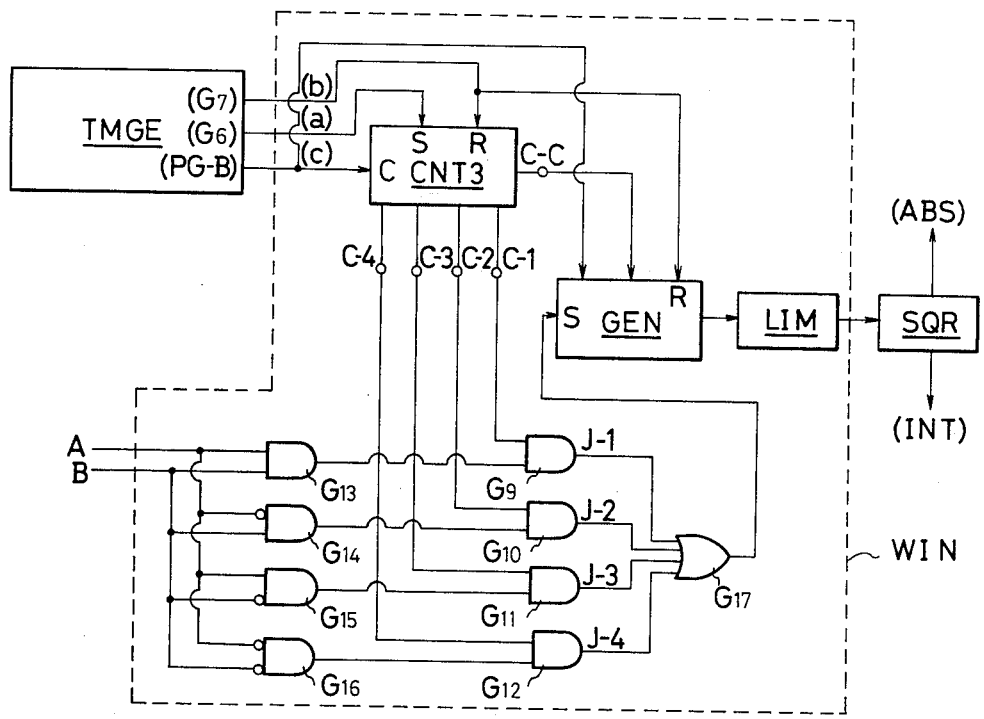
Figure 19:
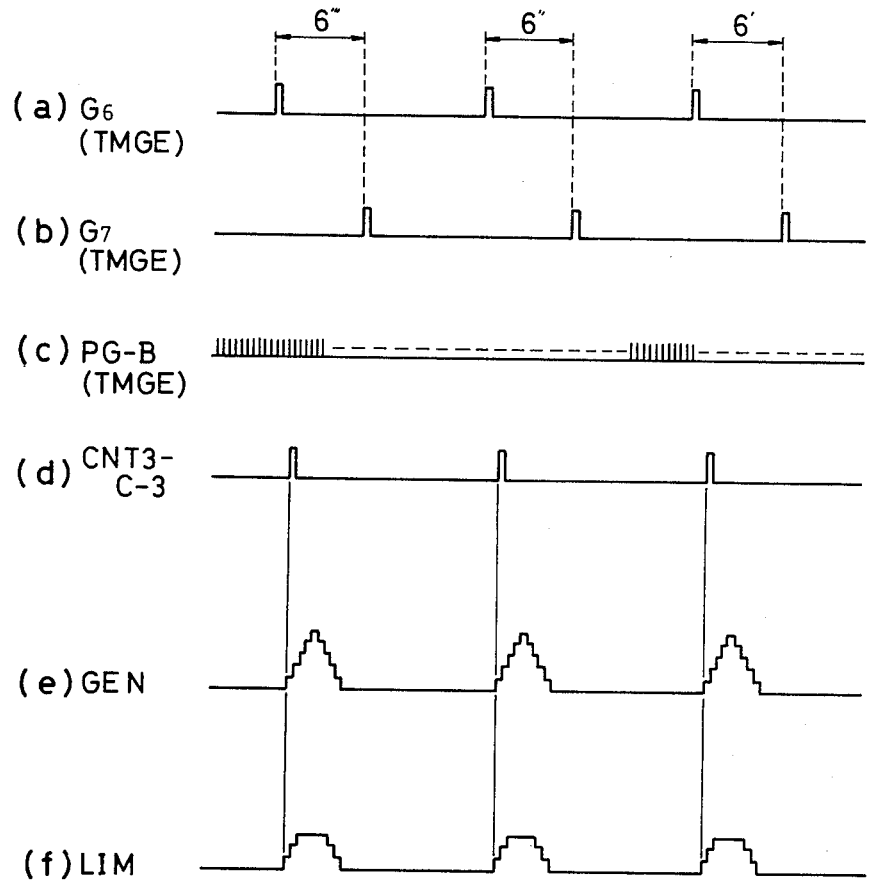
FIG. 19 is a timing chart of input/output signals at the respective parts of the circuit shown in FIG. 18B.

In this embodiment, this is accomplished by changing the width of the window function as shown in FIG. 5E in the manner as shown in FIG. 17. The details are shown in FIGS. 18A and 18B. FIG. 18A shows the change in the window function for the fields of view of detection J-1 to J-4. In each case, the window function is symmetrical about the center C of the light-receiving section. These window functions rise by a predetermined voltage for every two photosensitive elements of the CCD 6 to thereby generate stair step signals. A known type of stair step function generator may be used. The waveforms of these window functions become trapezoids of equal sides symmetrical about point C. FIG. 18B shows a circuit for changing the window functions. To the window function generator WIN indicated by the broken line are input from the timing generator TMGE, a pulse (output in response to the output from the OR gate G6 shown in FIG. 6) synchronous with the initial moment of light reception by an effective portion, other than a light-intercepting portion, of each of the light-receiving sections 6''', 6" and 6' of the CCD 6 shown in FIG. 19(a), a pulse (output in response to the output of the OR gate G7 shown in FIG. 6) synchronous with the moment of completion of light reception by the effective portion of each of the light-receiving sections 6''', 6" and 6' shown in FIG. 19(b), and a pulse as shown in FIG. 19(c) (output in response to the output from the pulse generator shown in FIG. 6) synchronous with the timing at which the signals from the photosensitive elements of the respective light-receiving sections 6''', 6" and 6' of the CCD 6 are read out. The output of the OR gate G6 is supplied to a set terminal of the counter CNT3, and the output of the OR gate G7 is supplied to a reset terminal of the counter CNT3. The signal train B from the pulse generator PG is input to a count input terminal of the counter CNT3. At the initial moment of light reception by the effective portion of each of the light-receiving sections 6''', 6" and 6', the counter CNT3 starts counting the number of the reading-out of the signals from each of the photosensitive elements. The counter CNT3 is reset at the moment of completion of light reception by each effective portion of the light-receiving sections 6''', 6" and 6'. The counter CNT3 has five output terminals. When the count increases and reaches the start of each of the fields of view J-1 through J-4, the counter CNT3 produces pulses from its output terminals C-1 through C-4. A pulse is generated from an output terminal C-C at the center of the field of view. Since each of the light-receiving sections 6''', 6" and 6' consists of a predetermined number of photosensitive elements, for example, 128 elements, it is easy to design the system so that the pulses may be generated at appropriate moments. These output terminals may be considered as intermediate tap terminals of the counter. FIG. 19(d) shows the timing at which the pulse C-3 is generated. Pulses C-1 through C-4 are input to the input ends of the respective AND gates G9 to G12. The outputs of AND gates G13 to G16 are input to the other input end of the respective AND gates G9 to G12. The AND gates G13 to G16 discriminates the four combinations of high and low levels of the terminals A and B described with reference to FIG. 11. When both the terminals A and B are at high level, the output of the AND gate G13 goes to high level. When the terminal A is at low level and the terminal B is at high level, the output of the AND gate G14 goes to high level. When the terminal A is at high level and the terminal B is at low level, the output of the AND gate G15 goes to high level. When both the terminals A and B are at low level, the output of the AND gate G16 goes to high level. Outputs J-1 to J-4 of the AND gates G9 to G12 are input to a set terminal of the stair step function generator GEN described above through the OR gate G17. In this manner, one of the outputs J-1 to J-4 is selected as the timing at which the pulses are output from the terminals C-1 to C-4, that is, the initial moment of light reception within the field of view shown in FIG. 18A, thereby selecting the width of the field of view. The window function generator GEN receives the start pulses described above as well as the signal train B from the pulse generator PG, and generates a stair step signal of a predetermined gradient in the up mode. However, when the output from the terminal C-C of the counter CNT3, that is, the signal representing the center of the light-receiving section is generated, the window function generator GEN generates a signal in the down mode. Therefore, the output of the stair step generator GEN is as shown in FIG. 19(e). The stair step generator GEN is reset by the output of the OR gate G7 when light reception by the light-receiving sections 6''', 6'' and 6' is completed. The output signal of the stair step function generator GEN is supplied to a limiter LIM so that it may not rise above a predetermined level. As a result, the window function becomes as shown in FIG. 19(f) as in the case of FIG. 5E to control the gain of the squaring circuit SQR. As may be seen from the foregoing description, the substantial field of view of detection can be changed by combining the input states of two terminals A and B. The number of inputs to be selected can be varied as required, and the circuit can be designed according to the number selected.

The configuration of the circuitry for generating the signals at the terminals A and B according to the specifications of the optical system may be one as shown in FIGS. 12 and 13.

Figure 20A:
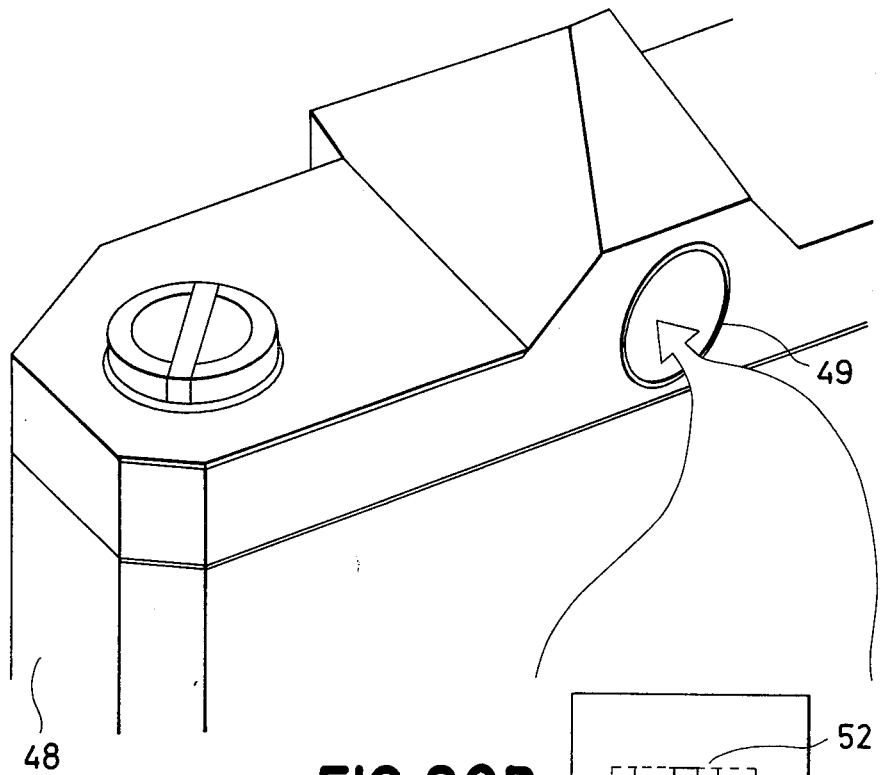
FIGS. 20A and 20B show an example of display of detecting field of view in a camera.
Figure 20B:
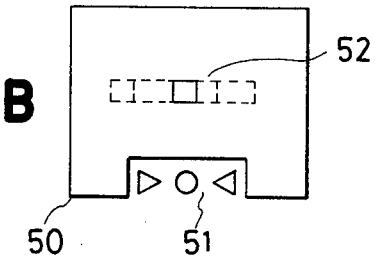
Figure 21A:
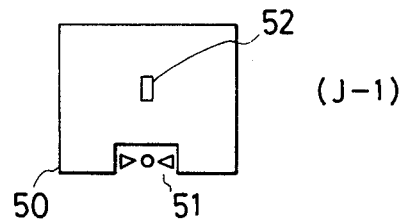
FIGS. 21A to 21D show the manner in which the display is changed as the detecting field of view is changed.
Figure 21B:
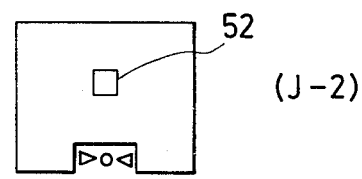
Figure 21C:
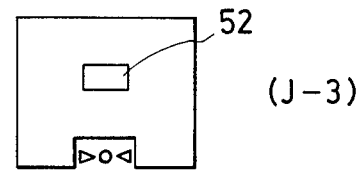
Figure 21D:
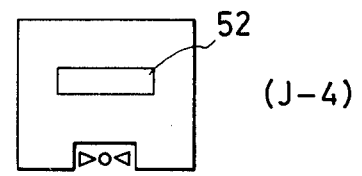

FIGS. 20A and 20B show a case wherein the field of view of detection as changed in the above manner is displayed in the range finder or another part of the camera. FIG. 20A shows a case wherein a changed field of view is displayed in a range finder 49 of a single lens reflex camera 48, as shown in FIG. 20B. A focusing state indicator 51 is shown at the recessed part of a range finder frame 50. A display means 52 comprises an analog display such as an electrochromy or a liquid crystal display device. Thus, the range of the field of view is indicated within the range finder. As the field of view is changed, the frame size of the field of view also changes as shown in FIGS. 21A to 21D. In this manner, the detecting field of view can be manually or automatically changed according to the associated lens. Further, since the changed field of view can be confirmed through the range finder, erratic operation is prevented and the focus detection operation can be performed with ease.

In summary, according to these embodiments of the present invention, the range of field of view for focus detection can be changed according to the conditions of the lens used. In addition to this, the selected field of view can be visually confirmed as needed. Thus, the present invention is very useful for optical devices such as cameras having a focus detecting system.

What is claimed is:

1. A focus detecting system capable of detecting the focusing state of an associated one of plurality of interchangeable lenses, each having a different focal length, said system comprising:
   (A) signal generating means for generating a signal indicative of the focal length of the associated lens,
   (B) focus detecting means for detecting the focusing state of a predetermined field of view of detection of the associated lens, and
   (C) means for changing the predetermined field of view of detection of said focus detecting means on the basis of the focal length signal generated by said signal generating means.

2. A focus detecting system according to claim 1, wherein said system further comprises display means for displaying the field of view of detection of said focus detecting means.

3. A focus detecting system according to claim 2, wherein said display means comprises an analog display unit.

4. A focus detecting system according to claim 3, wherein said analog display unit comprises an electrochromy.

5. A focus detecting system capable of detecting the focusing state of an associated one of a plurality of interchangeable lenses, each having a different focal length, said system comprising:
   (A) signal generating means for generating a signal indicative of the focal length of the associated lens;
   (B) focus detecting means for detecting the focusing state of a predetermined field of view of detection at a position along an extension of the optical axis of the associated lens, said focus detecting means comprising:
      (1) photo-electric conversion means consisting of a plurality of small photo-electric conversion elements, each dividing said field of view of detection;
      (2) reading out means for sequentially reading out from the photo-electric conversion element which corresponds to the edge portion of the field of view of detection signals from said photo-electric conversion elements, and
      (3) detecting means for amplifying the signals sequentially output by said photo-electric conversion means and generating the focusing state of the predetermined field of view of detection from said amplified signals; and
   (C) means for changing the predetermined field of view of detection of said focus detecting means on the basis of the focal length signal generated in said signal generating means, said changing means comprising:
      (1) a circuit means for producing a time period signal corresponding to the time between outputs of the element corresponding to the edge portion of said photo-electric conversion element for a predetermined number of the photo-electric conversion elements corresponding to the focal length information; and
      (2) means for reducing the amplification degree of said focus detecting means during output of the signal from said circuit means.

6. A focus detecting system according to claim 5, wherein said system further comprises display means for displaying the field of view of detection of said focus detecting means.

7. A focus detecting system according to claim 6, wherein said display means comprises an analog display unit.

8. A focus detecting system according to claim 7, wherein said analog display unit comprises an electrochromy.

9. A camera system for detecting whether the focusing state of a photo-taking lens is in an in-focus state at a position equivalent to a film plane, comprising:
   (a) a strobo unit having diaphram value information generating means for generating a diaphram value signal for the exposure of the film,
   (b) focus detecting means for detecting the focusing state of said photo-taking lens; and
   (c) in-focus range setting means for setting a range in which said camera system is considered to be within an in-focus state on the basis of the signal output from said focus detecting means and corresponding to the focusing state, said in-focus range setting means changing the in-focus range on the basis of said diaphragm value information generating means.

10. A camera system according to claim 9, wherein said camera system further comprises display means for displaying that said camera system is considered to be within an in-focus state by means of said focus detecting means.

11. A focus detecting system for detecting whether focusing state of the image formed from an object by a phototaking lens is in an in-focus state or not, said system comprising:

(a) diaphram signal generating means for outputting a signal which controls a diaphragm value of said photo-taking lens;

(b) focus detecting means for detecting a focusing state of said photo-taking lens by sharpness detection and for outputting a signal corresponding to the detected focusing state;

(c) first means for generating a signal corresponding to the brightness and contrast of an object to be imaged by said photo-taking lens;

(d) second means for normalizing an output signal from said focus detecting means and corresponding to the focusing state on the basis of the brightness and the contrast of the object and generating a signal corresponding to the focusing state which does not depend on the brightness and the contrast of the object;

(e) reference signal generating means for generating a reference signal which changes on the basis of the output of said diaphram signal generating means; and (f) discriminating means for comparing the output signal from said reference signal generating means with the output signal from said second means to discriminate whether or not the focusing state is in an in-focus state.

* * * * *

UNITED STATES PATENT AND TRADEMARK OFFICE
CERTIFICATE OF CORRECTION

PATENT NO. : 4,475,800

DATED : October 9, 1984

INVENTOR(S) : TAKAO KINOSHITA, ET AL.

It is certified that error appears in the above-identified patent and that said Letters Patent is hereby corrected as shown below:

Col. 1, line 66, delete "its".

Col. 3, line 42, insert "to" between "applied" and "the".

Col. 6, line 52, insert hyphen "-" between "current" and "compensated".

Col. 7, line 14, delete "a"; insert "an".

Col. 7, line 30, delete "so"; insert "so" between "CLKD" and "that".

Col. 13, line 16, delete "an"; insert "a".

Col. 16, line 44, delete "discriminates"; insert --discriminate--.

Signed and Sealed this

Thirty-first Day of December 1985

[SEAL]

Attest:

DONALD J. QUIGG

Attesting Officer

Commissioner of Patents and Trademarks